(12) United States Patent
Gekinozu

(10) Patent No.: US 6,362,984 B2
(45) Date of Patent: Mar. 26, 2002

(54) DC-DC CONVERTER

(75) Inventor: Masakazu Gekinozu, Tokyo (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/876,159

(22) Filed: Jun. 8, 2001

(51) Int. Cl.[7] ............................................. H02M 3/335
(52) U.S. Cl. ...................... 363/97; 363/19; 363/21.01; 363/21.02
(58) Field of Search ............................. 363/18, 19, 20, 363/21.01, 21.02, 21.04, 21.12, 97, 131

(56) References Cited

U.S. PATENT DOCUMENTS 5,995,382 A * 11/1999 Miyazaki et al. ............ 363/19
6,205,037 B1 * 3/2001 Fitzgerald, Jr. .......... 363/21.02
6,317,337 B1 * 11/2001 Yasumura ................ 363/21.04

* cited by examiner

Primary Examiner—Jessica Han
(74) Attorney, Agent, or Firm—Kanesaka & Takeuchi

(57) ABSTRACT

Transformer driving coils 24 and 25 are added to a DC-DC converter composed of a DC power supply 1, semiconductor switching devices 91 and 92, a transformer 2, rectifiers 81 and 82, a filter capacitor 3, and others, in order to perform a self-oscillating operation. On the other hand, an output-voltage detection and control circuit 6 is used to provide control consisting of both frequency and pulse-width modulation, thus keeping the output voltage constant without the use of any expensive IC circuits or pulse transformers.

4 Claims, 4 Drawing Sheets

DC-DC CONVERTER

BACKGROUND OF THE INVENTION AND RELATED ART STATEMENT

The present invention relates to a DC-DC converter for converting a DC voltage into a DC output via a transformer and, in particular, to a self-oscillating DC-DC converter that can keep an output voltage constant by providing control as consisting of both frequency and pulse-width modulation in response to variations in an input voltage or a load.

FIG. 8 shows a conventional example of a self-commutated resonant converter. As shown in this FIGURE, a DC power supply 1, a capacitor 4, a primary coil 21 of a transformer 2, and a semiconductor switching device 91 are connected together in series: a parallel circuit of a semiconductor switching device 92 and a capacitor 5 is connected between the capacitor 4 and the primary coil 21 of the transformer in parallel; diodes 81 and 82 and a filter capacitor 3 are connected to secondary coils 22 and 23 of the transformer 2; and a DC output is connected to the gates of the semiconductor switching devices 91 and 92 via an output-voltage detection and control circuit 6, a frequency control circuit 14, and a high-voltage-resistant driver IC 15.

FIG. 9 shows an example of the operation of the converter illustrated in FIG. 8. References $v_{92}$, $v_{91}$, $v_4$, and $v_{21}$ denote voltage waveforms from the semiconductor switching device 92, the semiconductor switching device 91, the capacitor 4, and the primary coil 21 of the transformer, and references $i_{92}$, $i_{81}$, and $i_{82}$ denote current waveforms from the semiconductor switching device 91, the semiconductor switching device 92, the diode 81, and the diode 82.

During a period ①, when the semiconductor switching device 91 is turned on, the resonant current $i_{91}$ flows through the DC power supply 1→the capacitor 4→the primary coil 21 of the transformer→the semiconductor switching device 91 to charge the capacitor 4. At this time, the difference in voltage between the DC power supply and the capacitor 4 is applied to the primary coil 21 of the transformer to charge the filter capacitor 3 via the diode 81, while supplying power to a load.

During a period ②, when the semiconductor switching device 91 is turned off, the resonant current is commuted to the output capacities of the semiconductor switching devices 91 and 92 and the capacitor 5, thereby gradually raising or lowering the voltages at the semiconductor switching devices 91 and 92. During a period ③, once the voltage at the semiconductor switching device 91 reaches the DC power-supply voltage, the resonant current is commuted to a parasitic diode of the semiconductor switching device 92. At this time, when the semiconductor switching device 92 is turned on, the resonant current $i_{92}$ flows through the capacitor 4→the semiconductor switching device 92→the primary coil 21 of the transformer to discharge the capacitor 4. Further, the difference in voltage between the DC power supply and the capacitor 4 is applied to the primary coil 21 of the transformer to charge the filter capacitor 3 via the diode 82, while supplying power to the load.

During a period ④, when the semiconductor switching device 92 is turned off, the resonant current is commuted to the output capacities of the capacitor 5 and the semiconductor switching devices 91 and 92, thereby gradually raising or lowering the voltages at the semiconductor switching devices 91 and 92. During the period, ①, once the voltage at the semiconductor switching device 92 reaches the DC power-supply voltage, the resonant current is commuted to a parasitic diode of the semiconductor switching device 91. At this time, when the semiconductor switching device 91 is turned on, such an operation is repeated to supply DC output power insulated from the DC power supply. The circuit illustrated in FIG. 8 operates as illustrated in FIG. 9, regardless of its load state (light or heavy load) or input voltage.

In the conventional example illustrated in FIG. 8, in response to variations in the load, the output-voltage detection and control circuit and the frequency control circuit are used to modulate the operating frequencies of the semiconductor switching devices, in order to keep the output voltage constant. This method is not based on the current commonly used pulse-width modulation method, and requires relatively expensive high-voltage-resistant driver ICs to drive the semiconductor switching device 92. Further, the frequency control circuit may be replaced by a pulse-width modulation circuit, and the high-voltage-resistant driver ICs may be replaced by pulse transformers, though the use of pulse transformers hinders size reduction.

It is thus an object of the present invention to eliminate the need for high-voltage-resistant driver ICs or pulse transformers in order to reduce costs.

SUMMARY OF THE INVENTION

To attain this object, the invention set forth in claim 1 provides A DC-DC converter for converting DC power from a DC power supply into an arbitrary DC output via a transformer, with the DC-DC converter being characterized in that:

the DC power source, a first capacitor, a primary coil of the transformer, a first semiconductor switching device, and a current-limiting resistor are connected together in series; a parallel circuit of a second semiconductor switching device and a second capacitor is connected between the first capacitor and the primary coil of the transformer in parallel; first and second transformer driving coils are each connected between a gate and a source of the first or second semiconductor switching device, respectively, via a resistor; an activation circuit and a transistor are connected between the gate and source of the first semiconductor switching device; the base of the transistor is connected to a connection between the first semiconductor switching device and the current-limiting resistor via a base resistor; a diode and a filter capacitor are connected to a secondary coil of the transformer; and a DC output is connected to the base of the transistor via an output-voltage detection and control circuit.

The invention set forth in claim 2 provides a DC-DC convertor for converting DC power from a DC power supply into an arbitrary DC output via a transformer, with the DC-DC converter being characterized in that:

the DC power source, a first capacitor, a primary coil of the transformer, a first semiconductor switching device, and a current-limiting resistor are connected together in series; a parallel circuit of a second semiconductor switching device and a second capacitor is connected between the first capacitor and the primary coil of the transformer in parallel; first and second transformer driving coil are each connected between a gate and a source of the first and second semiconductor switching device, respectively, via a resistor; an activation circuit and a transistor are connected between the gate and source of the first semiconductor switching device; the base of the transistor is connected to a connection between the first semiconductor switching device and the current-limiting resistor via a base resistor; a first diode is connected to one terminal of a first secondary coil of the transformer so as to supply power when a positive voltage is applied to the primary coil of the transformer; a second diode is connected to one terminal of a second secondary coil of the transformer so as to supply power when a negative voltage is applied to the primary coil of the transformer; cathodes of the first and second diodes are connected to one terminal of a filter capacitor; the other terminals of the first and second coils of the transformer are both connected to the other terminal of the filter capacitor; and a DC output is connected to the base of the transistor via an output-voltage detection and control circuit.

In the invention set forth in claim 2, magnetic coupling between the primary coil of the transformer and the first secondary coil of the transformer is closer than that between the primary coil of the transformer and the second secondary coil of the transformer (invention set forth in claim 3), or magnetic coupling between the primary coil of the transformer and the second secondary coil of the transformer is closer than that between the primary coil of the transformer and the first secondary coil of the transformer (invention set forth in claim 4).

DETAILED DESCRIPTION OF PREFERRED EMBODIMENTS

Figure 1:
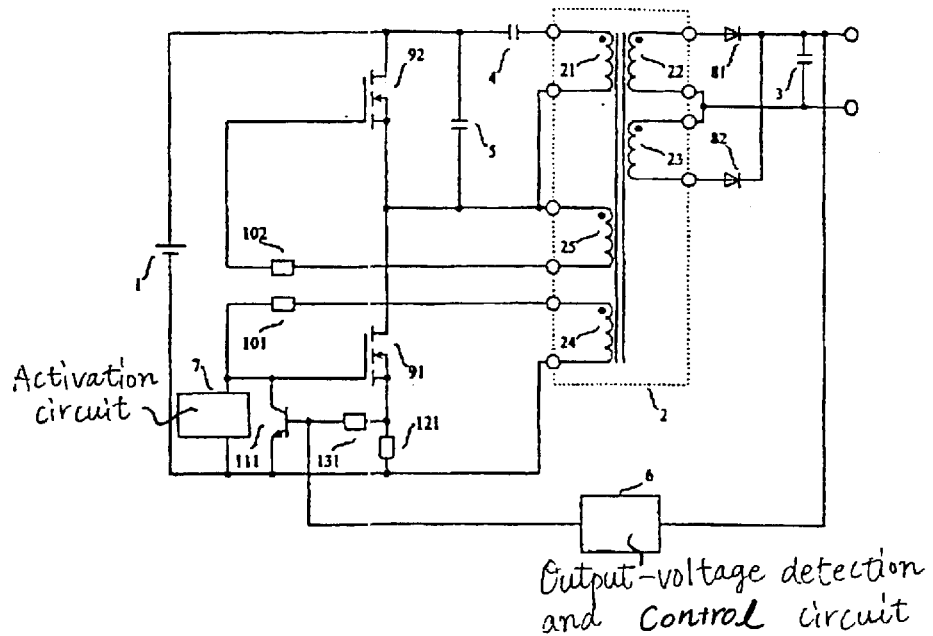
FIG. 1 is a circuit diagram showing a first embodiment of the present invention.

FIG. 1 is a circuit diagram showing an embodiment of the present invention. In this FIGURE, a DC power source 1, a capacitor 4, a primary coil 21 of a transformer, a first semiconductor switching device 91, and a current-limiting resistor 121 are connected together in series; a parallel circuit of a semiconductor switching device 92 and a capacitor 5 is connected between the capacitor 4 and the primary coil 21 of the transformer in parallel; a transformer driving coil 24 is connected between a gate and a source of the semiconductor switching device 91 via a resistor 101; a transformer driving coil 25 is connected between a gate and a source of the semiconductor switching device 92 via a resistor 102; an activation circuit 7 and a transistor 111 are connected between the gate and source of the semiconductor switching device 91; the base of the transistor 111 is connected to a connection between the semiconductor switching device 91 and the current-limiting resistor 121 via a base resistor 131; diodes 81 and 82 and a filter capacitor 3 are connected to secondary coils 22 and 23 of the transformer; and a DC output is connected to the base of the transistor 111 via an output-voltage detection and control circuit 6. The activation circuit 7 determines the start of self-oscillation.

Figure 3:
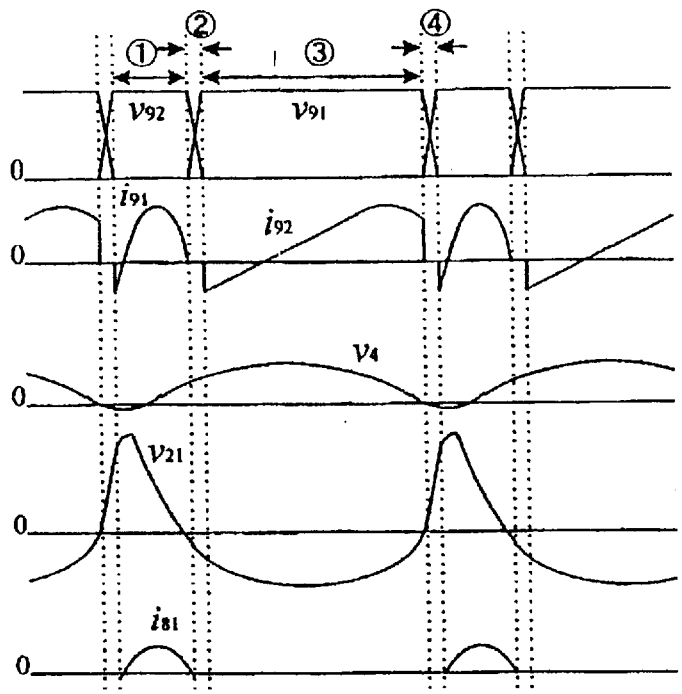
FIG. 3 is a waveform diagram useful in explaining the operations of the circuits illustrated in FIGS. 1 and 2.

The operation performed by the converter illustrated in FIG. 1 while the load is light will be described with reference to FIG. 3.

During a period ①, when the semiconductor switching device 91 is turned on, the resonant current $i_{91}$ flows through the DC power supply 1→the capacitor 4→the primary coil 21 of the transformer→the semiconductor switching device 91 to charge the capacitor 4. At this time, the difference in voltage between the DC power supply and the capacitor 4 is applied to the primary coil 21 of the transformer to charge the filter capacitor 3 via the diode 81, while supplying power to a load. The voltage applied to the transformer driving coils 24 and 25 is equal to the inverse of the turn ratio of the primary coil 21 of the transformer. Once the voltage across the transformer driving coil 24 reaches the gate threshold voltage of the semiconductor switching device 91, the semiconductor switching device 91 is turned off.

During a period ②, when the semiconductor switching device 91 is off, the resonant current is commuted to the output capacities of the capacitor 5 and the semiconductor switching devices 91 and 92, thereby gradually raising or lowering the voltages at the semiconductor switching devices 91 and 92. During a period ③, once the voltage at the semiconductor switching device 91 reaches the DC power-supply voltage, the resonant current is commuted to a parasitic diode of the semiconductor switching device 92. At this time, when the voltage across the transformer driving coil 25 reaches the gate threshold voltage of the semiconductor switching device 92, the semiconductor switching device 92 is turned on. The resonant current $i_{92}$ thus flows through the capacitor 4→the semiconductor switching device 92→the primary coil 21 of the transformer to discharge the capacitor 4. Further, the difference in voltage between the DC power supply and the capacitor 4 is applied to the primary coil 21 of the transformer, but since the voltage generated in the primary coil 23 of the transformer is lower than the output voltage, the diode 182 is not electrically conductive. Once the voltage across the transformer driving coil 25 reaches the gate threshold voltage of the semiconductor switching device 92, the semiconductor switching device 92 is turned off.

During a period ④, when the semiconductor switching device 92 is turned off, the resonant current is commuted to the output capacities of the capacitor 5 and the semiconductor switching devices 91 and 92, thereby gradually raising or lowering the voltages at the semiconductor switching devices 91 and 92. During the period ①, once the voltage at the semiconductor switching device 92 reaches the DC power-supply voltage, the resonant current is commuted to a parasitic diode of the semiconductor switching device 91. At this time, when the voltage across the transformer driving coil 24 reaches the gate threshold voltage of the semiconductor switching device 91, the semiconductor switching device 91 is turned on. Such an operation is repeated to supply DC output power isolated from the DC power supply.

The output-voltage detection and control circuit 6 operates to keep the output voltage constant. If the output voltage is lower than a set value, the output-voltage detection and control circuit 6 lowers its output to reduce the base current flowing through the transistor 111 (increases the length of time for which the semiconductor switching device 91 is on). On the contrary, if the output voltage is higher than the set value, the output-voltage detection and control circuit 6 raises its output to increase the base current flowing through the transistor 111 (reduces the length of time for which the semiconductor switching device 91 is on). As a result, control is provided such that the output voltage is kept constant based on the pulse-width modulation method, by which the output-voltage detection and control circuit 6 limits the length of time for which the semiconductor switching device 91 is on.

The operation performed by the converter illustrated in FIG. 1 while the load is heavy is the same as that illustrated in FIG. 1, so a description thereof is omitted. The operation may be performed as illustrated in FIG. 3 irrespective of the load state, that is, regardless of whether the load is light or heavy. However, the operation depends on the capacity of the capacitor 4, the number of turns in the primary and secondary coils of the transformer, and the like.

Figure 2:
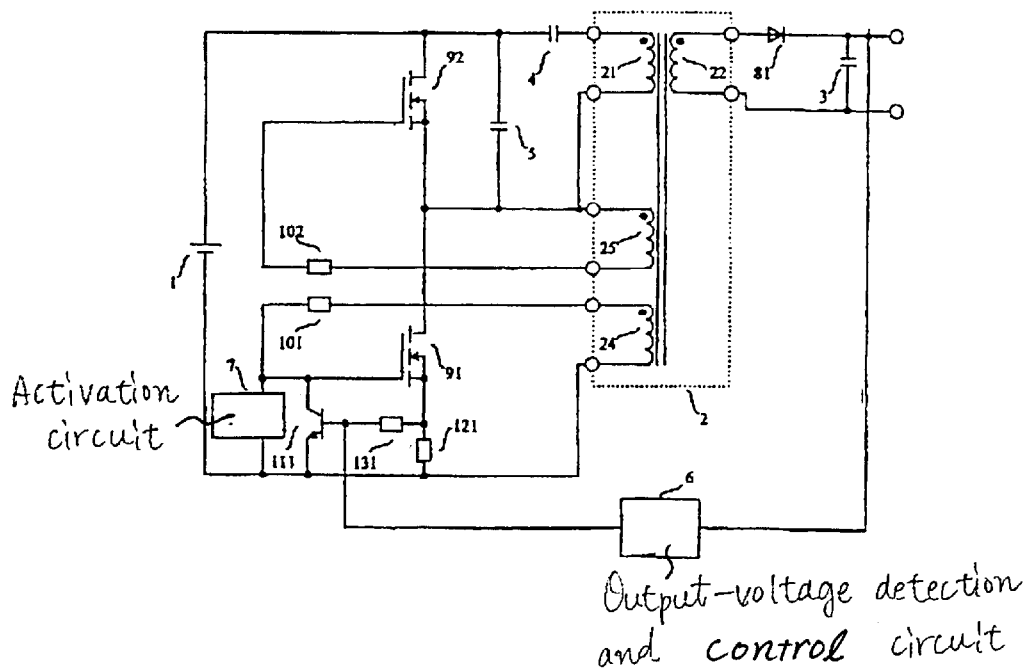
FIG. 2 is a circuit diagram showing a second embodiment of the present invention.

FIG. 2 is a circuit diagram showing a second embodiment of the present invention. The second embodiment differs from the embodiment illustrated in FIG. 1 in that the secondary coil 23 of the transformer and the diode 82 are omitted. Accordingly, while the load is heavy, DC output power is supplied only through the secondary coil 22 of the transformer. As a result, operating waveforms such as those illustrated in FIG. 3 are obtained regardless of the load state, so that no power is supplied to the load while the semiconductor switching device 92 is on.

Figure 10:
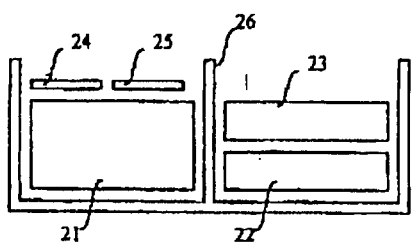
FIG. 10 is a structure diagram showing a general example of the coils of a transformer.
Figure 8:
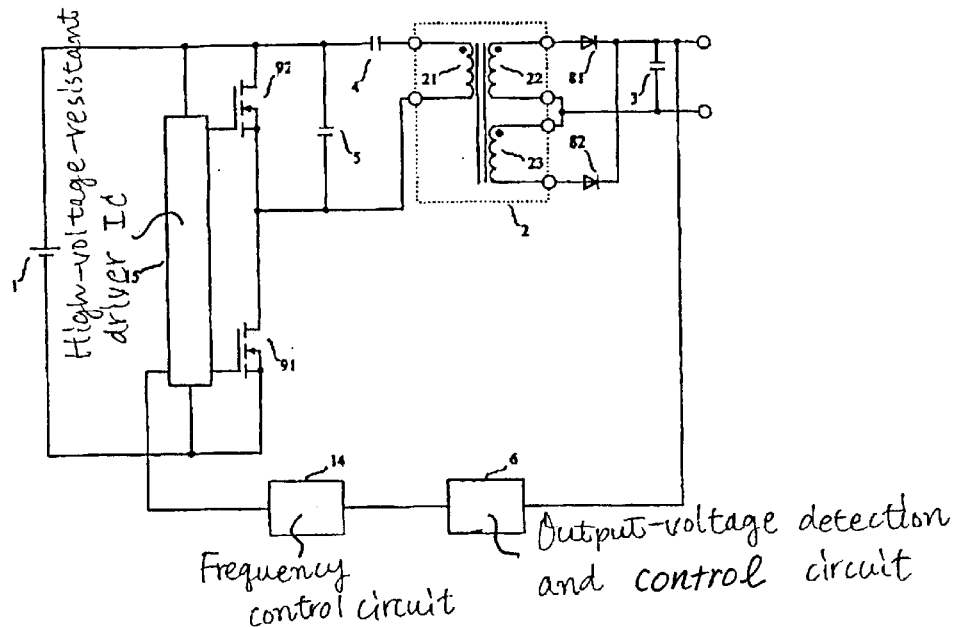
FIG. 8 is a circuit diagram showing a conventional example of a DC-DC converter.
Figure 9:
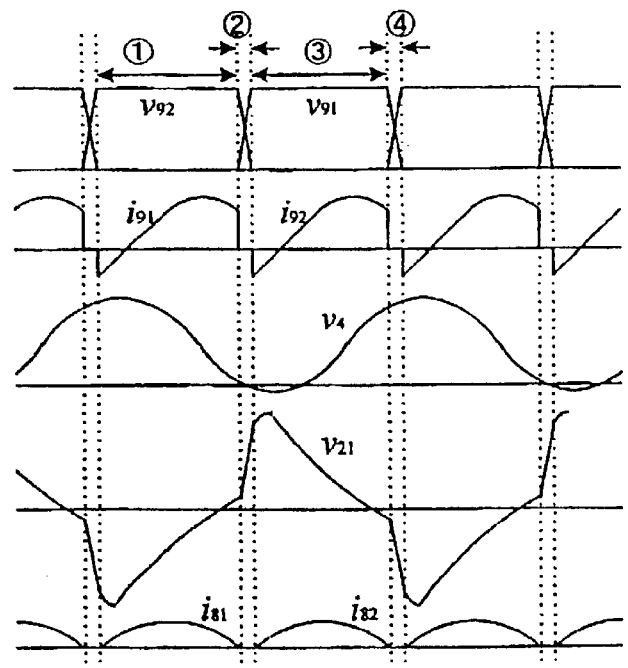
FIG. 9 is a waveform diagram useful in explaining the operation of the converter illustrated in FIG. 8.

Next, the structure of the coils of the transformer illustrated in FIG. 1 will be discussed, FIG. 10 is a structure diagram showing a general example of a coil of a transformer. References 21 to 25 denote the same components as those in FIG. 1. Reference 26 denotes a bobbin for coils. That is, the secondary coils 22 and 23 of the transformer are at the same distance from the primary coil 21 of the transformer, though they are located at vertically different locations. Consequently, the degree of coupling between the secondary coil 22 of the transformer and the primary coil 21 of the transformer is substantially the same as that between the secondary coil 23 of the transformer and the primary coil 21 of the transformer. Further, in a general separately excited current resonant converter, the semiconductor switching devices 91 and 92 have the same "on" period (the output voltage is kept constant by means of frequency modulation) and thus operate as illustrated in FIG. 9, regardless of whether the load is heavy or light. Consequently, substantially equivalent power is alternately supplied to the load through the secondary coils 22 and 23 of the transformer.

Figure 4:
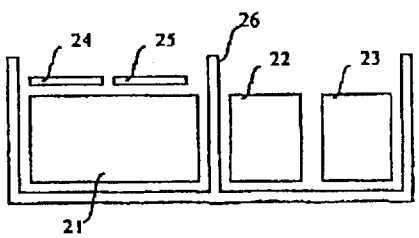
FIG. 4 is a structure diagram of a transformer showing a third embodiment of the present invention.

As described above, when the coils of the transformer in the circuit illustrated in FIG. 1 are configured so that the magnetic coupling between one of the two secondary coils of the transformer and the primary coil of the transformer is substantially the same as that between the other secondary coil of the transformer and the primary coil of the transformer as illustrated in FIG. 10, the conversion efficiency may decrease while the load is light, or it may not be possible to effectively use the secondary coils of the transformer. The present invention solves this problem as follows:

FIG. 4 is a structure diagram showing a third embodiment of the present invention. This example is characterized in that the secondary coil 22 of the transformer is arranged closer to the primary coil 21 of the transformer than the secondary coil 23 of the transformer. Thus, the secondary coil 22 of the transformer can efficiently transmit power from the primary coil 21 of the transformer to the load, thereby improving the efficiency while the load is light.

Figure 5:
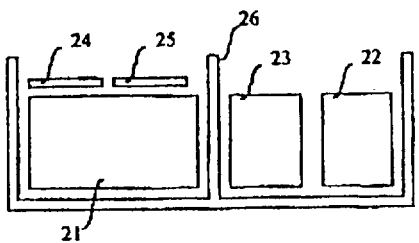
FIG. 5 is a structure diagram of a transformer showing a fourth embodiment of the present invention.

FIG. 5 is a structure diagram showing a fourth embodiment of the present invention. The secondary coil 23 of the transformer is arranged closer to the primary coil 21 of the transformer than the secondary coil 22 of the transformer. Thus, more power from the primary coil 21 of the transformer is supplied to the secondary coil 23 of the transformer, thereby improving the utilization of the secondary coil 23 of the transformer and the second diode 82.

Figure 6:
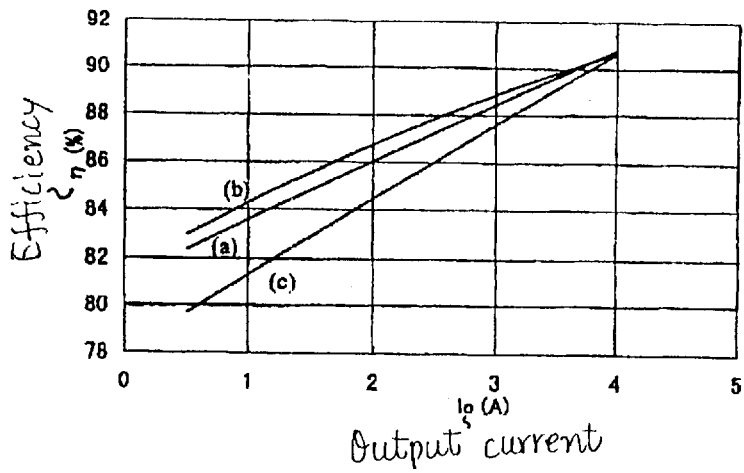
FIG. 6 is a comparative explanatory representation useful in explaining the efficiency characteristics of converters.

FIG. 6 is a graph useful in explaining efficiency characteristics.

FIGS. 6(*a*), 6(*b*), and 6(*c*) show the characteristics of the transformers illustrated in FIGS. 10, 4, and 5, respectively, as exhibited during operation. These FIGURES indicate that while the load is heavy (an area with a high output current $I_o$), all of the transformers achieve a substantially equivalent efficiency, whereas while the load is light, the transformer illustrated in FIG. 6(*b*) achieves a higher efficiency.

Figure 7:
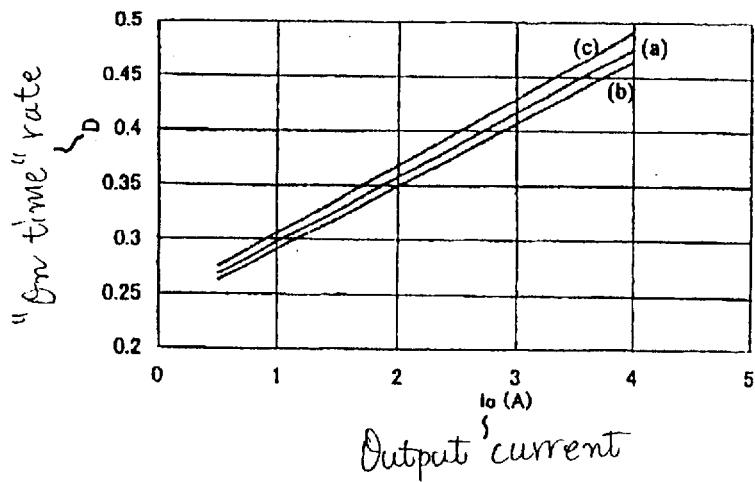
FIG. 7 is a comparative explanatory representation useful in explaining the "one time" rate characteristics of switching devices.

FIG. 7 is a graph useful in explaining "on time" rate characteristics.

FIGS. 7(*a*), 7 (*b*), and 7(*c*) show the characteristics of the transformers illustrated in FIGS. 10, 4, and 5, respectively, as exhibited during operation. These FIGURES indicate that if the semiconductor switching device 91 has a high "on time" rate, the utilization of the secondary coil 23 of the transformer and the diode 82 is improved while the load is heavy, and that the semiconductor switching device 91 has the highest "on time" rate in the case of FIG. 7(*c*), with this tendency clearer while the load is heavy.

According to the present invention, in response to variations in the input voltage or the load, the pulse width and the frequency are simultaneously modulated so that the frequency varies automatically based on the self-oscillating operation. This eliminates the need for relatively expensive high-voltage-resistant driver ICs and pulse transformers which hinder size reduction, as both the high-voltage-resistant driver ICs and the pulse transformers are used to drive the semiconductor switching devices.

Further, as set forth in claims 3 and 4, the closer magnetic coupling between the primary coil of the transformer and the first secondary coil of the transformer improves the efficiency while the load is light, and the closer magnetic coupling between the primary coil of the transformer and the second secondary coil of the transformer improves the utilization of the second secondary coil of the transformer and the second diode.

What is claimed is:

1. A DC-DC converter for converting DC power from a DC power supply into an arbitrary DC output via a transformer, with the DC-DC converter being characterized in that:

said DC power source, a first capacitor, a primary coil of the transformer, a first semiconductor switching device, and a current-limiting resistor are connected together in series; a parallel circuit of a second semiconductor switching device and a second capacitor is connected between said first capacitor and said primary coil of said transformer in parallel; first and second transformer driving coils are each connected between a gate and a source of said first or second semiconductor switching device, respectively, via a resistor; an activation circuit and a transistor are connected between the gate and source of the first semiconductor switching device; a base of said transistor is connected to a connection between the first semiconductor switching device and said current-limiting resistor via a base resistor; a diode and a filter capacitor are connected to a secondary coil of said transformer; and a DC output is connected to the base of the transistor via an output-voltage detection and control circuit.

2. A DC-DC converter for converting DC power from a DC power supply into an arbitrary DC output via a transformer, with the DC-DC converter being characterized in that:

said DC power source, a first capacitor, a primary coil of the transformer, a first semiconductor switching device and a current-limiting resistor are connected together in series; a parallel circuit of a second semiconductor switching device and a second capacitor is connected between said first capacitor and said primary coil of said transformer in parallel; first and second transformer driving coils are each connected between a gate and a source of said first or second semiconductor device, respectively, via a resistor; an activation circuit and a transistor are connected between the gate and source of the first semiconductor switching device; a base of said transistor is connected to a connection between the first semiconductor switching device and said current-limiting resistor via a base resistor; a first diode is connected to one terminal of a first secondary coil of the transformer so as to supply power when a positive voltage is applied to said primary coil of said transformer; a second diode is connected to one terminal of a second secondary coil of the transformer so as to supply power when a negative voltage is applied to said primary coil of said transformer; cathodes of said first and second diodes are both connected to one terminal of a filter capacitor; the other terminals of said first and second secondary coils of the transformer are both connected to the other terminal of said filter capacitor; and a DC output is connected to the base of said transistor via an output-voltage detection and control circuit.

3. The DC-DC converter according to claim 2, characterized in that magnetic coupling between said primary coil of said transformer and said first secondary coil of said transformer is closer that than between said primary coil of said transformer and said second secondary coil of said transformer.

4. The DC-DC converter according to claim 2, characterized in that magnetic coupling between said primary coil of said transformer and said second secondary coil of said transformer is closer than that between said primary coil of said transformer and said first secondary coil of said transformer.

* * * * *

UNITED STATES PATENT AND TRADEMARK OFFICE
CERTIFICATE OF CORRECTION

PATENT NO.   : 6,362,984 B2
DATED        : March 26, 2002
INVENTOR(S)  : Masakazu Gekinozu It is certified that error appears in the above-identified patent and that said Letters Patent is hereby corrected as shown below:

Column 1,
Line 29, before "$i_{92}$," add -- $i_{91}$, --;
Line 64, change "period, ①," to -- period ①, --;

Column 2,
Line 58, change "coil" to -- coils --;
Line 59, change "and" (second occurrence) to -- or --;

Column 3,
Line 7, before "coils" add -- secondary --;
Line 38, change "one time" to -- on time --;

Column 4,
Line 42, change "182" to -- 82 --;

Column 5,
Line 29, change "discussed," to -- discussed. --, and change paragraph from "FIG. 10 ...";

Column 7,
Line 17, before "device" add -- switching --; and

Column 8,
Line 15, change "that than" to -- than that --

Signed and Sealed this

Seventeenth Day of September, 2002

Attest:

JAMES E. ROGAN
*Attesting Officer*   *Director of the United States Patent and Trademark Office*